United States Patent
Gangi

[15] 3,653,954
[45] Apr. 4, 1972

[54] METHOD OF COATING WITH SLOW-GELLING POLYESTER COMPOSITION

[72] Inventor: Raymond Paul Gangi, Brooklyn, N.Y.

[73] Assignee: Woolsey Marine Industries, Inc.

[22] Filed: May 4, 1970

[21] Appl. No.: 34,632

[52] U.S. Cl. ................................ 117/132 C, 117/49, 117/94, 260/40 R, 260/863
[51] Int. Cl. .......................................... B44d 1/36, C08k 1/02
[58] Field of Search .................................................. 260/863

[56] References Cited

UNITED STATES PATENTS

| 3,398,213 | 8/1968 | Chetakian | 260/863 |
| 2,931,784 | 4/1960 | Raymond | 260/864 X |

OTHER PUBLICATIONS

Kolczynski et al., " Activated Decomposition of Organic Peroxides in Unsaturated Polyester Resins" (see Chem. Abs. 71:30962y) 2– 18– 69. 8 pages.
Modern Plastics Encyclopedia for 1965, vol. 42, no. 1A (Sept. 1964), McGraw– Hill, Inc., page 528.

Primary Examiner—Allan Lieberman
Assistant Examiner—S. M. Person
Attorney—Marvin Reich

[57] ABSTRACT

A method is provided for formulating a resinous coating composition which can be coated onto a metallic surface for prolonged periods without gelation. By mixing a ketone with a metallic promotor and subsequently adding the product to a polyester resin composition containing a peroxide catalyst, compositions of enhanced pot life are obtained without sacrifice of any of the desired coating characteristics.

7 Claims, No Drawings

METHOD OF COATING WITH SLOW-GELLING POLYESTER COMPOSITION

The present invention is concerned with coating compositions, methods of application and particularly with hardenable mixtures of unsaturated polyester compositions and inert materials having extended pot life.

In a more specific aspect, the present invention is concerned with improved marine coatings and particularly with the ease with which said coatings may be applied.

Marine coatings, now widely used, are generally polyester resins strengthened with glass, i.e. flake, filament, etc. A single coat of such a composition may average up to 120 layers of glass. These laminations not only provide a coating unusually resistant to erosion and abrasion, but drastically reduce the rate at which water or corrosive ions can pass through the film.

While glass filled polyester resins of the general type described above are of tremendous value in marine applications, many difficulties have been experienced in the successful application of these compositions to ship surfaces, and other static marine structures. For example, quickness of gel and, accordingly, short pot life, has been one of the most serious shortcomings since the period of use is drastically reduced.

Various methods have been employed to enhance pot life while attempting to insure good cure of the coating. Perhaps the best known of these methods are (1) a split phase system and (2) a catalyst injection system. Each of these systems, as described hereinbelow, requires special formulation methods and elaborate equipment, and most seriously, results in conditions under which the resinous coating system gels too rapidly in the reservoir or pot, thus shortening the period in which a given quantity of coating may be successfully applied to a metal surface.

The split phase system requires the formulation of three separate components. Usually, component (1) comprises a certain portion of the basic resinous composition and a promoter; component (2) comprises a certain portion of the basic resinous system without a promotor; and component (3) is a certain portion of a suitable catalyst. Coating of the three components onto a metallic surface requires elaborate equipment of the type now known to the trade.

The catalyst injection system, on the other hand, employs spraying equipment in which a large amount of the basic resinous composition and a small quantity of catalyst are applied to a metallic surface through a dual component gun, the two components being joined into a single stream just prior to impingement on the surface.

The split phase system requires the packaging and shipping of three separate components and accordingly, in addition to short pot life, entails certain other obvious economic disadvantages.

It has now been found that considerably longer pot life and all of the processing advantages resulting therefrom can be obtained by employing the compositions and method of formulating such compositions hereinafter described. For purposes of brevity, the resinous system, its preparation and method of application herein described will be referred to as "the extended pot life system."

The rate of free radical formation, when using a peroxide catalyst, is known to have certain effects on the rate of polymerization, cure, etc. Generally, a metallic promotor is employed to initiate the formation of free radicals. Among the promotors commonly used, are metallic organic compounds such as naphthenates of cobalt, vanadium, manganese, copper, zirconium, lead, lithium, calcium, zinc, cerium, etc. Other useful promotors include octoates and tallates of these metals. It is also known that these promotors may exist in several valence states, during the course of the polymerization.

It has now been found that glass filled polyester resin compositions useful for marine coatings can be formulated in a manner which gives considerably longer pot life to these compositions without altering the ultimate complete cure, or without affecting any of the desired characteristics of the cured film.

The rate of decomposition of a peroxide catalyst or of free radical formation may be governed by control of the ratio of one valence state of the metallic promotor to its higher valence state. This condition may be achieved by employing a ketone such as pentanedione with a metallic promotor along with the peroxide catalyst. The synergistic effect of the two acting together on a peroxide catalyst has resulted in free radical formation at a desired or controllable rate. It has now been found that addition of these components to a coating composition in the specific manner of this invention is required in order to achieve the results desired, that is, extended pot life and excellent cure characteristics.

In formulating the coating compositions of the extended pot life system of this invention, a basic resin formulation comprising glass flakes, inerts and other components is blended with a previously mixed blend of a metallic promotor and a ketone such as pentanedione. This mix is packaged as a single component and at the point of application, a catalyst is added and blended therewith. By formulation of the coating composition in this manner and by adding the catalyst as described, considerably longer pot life is obtained than with previously described systems. The improvement is substantial as will hereinafter be seen.

Generally, as employed herein, the base resin is an unsaturated polyester well known to the art and described, for example, in U.S. Pat. No. 2,931,784, to Raymond. They are generally prepared by the reaction of an $\alpha,\beta$-unsaturated $\alpha,\beta$-polycarboxylic acid or anhydride with a glycol. Typical examples of polybasic acids and anhydrides which may be used to prepare the unsaturated polyesters are maleic, fumaric, itaconic, aconitic, mesaconic, citraconic, ehtylmaleic, and dichloromaleic acids and their anhydrides. The foregoing polybasic acids or anhydrides may be esterified with such dihydric alcohols as ethylene glycol, diethylene glycol, 1,2-propylene glycol, 1,2- or 1,3-dipropylene glycol, 1,3-propylene glycol, 1,3-butylene glycol, 1,2-butylene glycol, neopentyl glycol, 1,3-pentanediol, and 1,5-pentanediol. The polyesters may be modified by adding to the esterification reaction other modifying polybasic acids or anhydrides such as, for example, phthalic, terephthalic, isophthalic, succinic, adipic, suberic, azealic, sebacic and 3,6-endomethylene, tetrahydrophthalic acids and anhydrides or their derivatives, such as the halogen-substituted derivatives of the aforementioned acids or anhydrides, examples of which are tetrachlorophthalic and hexachloroendo-methylene-tetrahydrophthalic acid. If desired, small amounts of monobasic acids or/and monohydric alcohols, such as propionic acid, butyric acid, saturated and unsaturated higher fatty acids, for instance, palmitic acid, stearic acid, linoleic acid, soybean oil fatty acid, ricinoleic acid and so on, and benzoic acid, as well as amyl alcohol and higher aliphatic alcohols, cyclohexanol, and methylcyclohexanol, may also be used for modifying the polyesters.

A special group of unsaturated polyesters the solutions of which in monomeric ethylene compounds, such as styrene may be used as air-drying and hardening lacquers are obtained by poly-condensing $\alpha,\beta$-unsaturated dicarboxylic acids as mentioned above with hydroxy compounds containing $\beta,\alpha$-ethylenically unsaturated ether groups as described, for example, in U.S. Pat. No. 2,852,482, to Maker and British Pat. No. 810,222, to Farbenfabriken Bayer Aktiengesellschaft. Examples of such either alcohols are allyl, methallyl, ethallyl, chlorallyl, crotyl and cinnamyl ethers of di- or polyhydric alcohols, such as glycols, glycerine, trimethylolethane, -propane, -butane, pentaerythritol, etc., for instance, the glycerol $\alpha$-allylethers, trimethylolethane monomethallyl ether, trimethylolpropane mono- and diallyl ethers, pentaerythritol mono- and triallyl ethers, and glycidallyl ether (allyloxy-2,3,-epoxypropane). The $\beta,\alpha$-unsaturated ether radical may also be introduced into the polyester as an ether acid such as alkyloxysuccinic acid and $\beta$-allyloxypropionic acid.

The monomeric ethylene compounds copolymerizable with the unsaturated polyesters which may be used for preparing the "unsaturated polyester resins" mentioned above are likewise well known in the art and are also described, for example, in the aforementioned Raymond U.S. Pat. No.2,931,784. Typical representatives of these compounds are, for example, styrene, vinyltoluene, halogenated styrenes and vinyltoluenes, divinylbenzene, vinyl esters, such as vinyl acetate, acrylic and methacrylic acids and their derivatives, aliphatic and aromatic allyl, diallyl and triallyl compounds, such as esters and ethers thereof, for instance, allyl acetate, diallyl phthalate, triallyl phosphatae, diallyl ether, etc.

The metallic promotors described previously are useful in this invention. Generally, cobalt naphthenate is preferred.

In the formulation of the present coating compositions, the basic resin formulation is prepared by blending an unsaturated polyester with a cross-linking agent, a strengthening agent such as glass flakes, a thixotropic agent, such as very lightly powdered silica and a glycol which combines synergistically with the silica to give greater body. The previously described mix of promotor and ketone is added to this formulation as a separate component. Other components may include pigments and an air inhibitor such as paraffin wax, although other inhibitors may be used.

With regard to the unsaturated polyester, it has been found that most air cured polyesters may be used. One suitable polyester may be prepared by reaction of 4 moles of isophthalic acid, 4 moles of maleic anhydride and 16 moles of diethylene glycol. Another useful polyester for the present purposes may be prepared by reacting 4 moles of isophthalic acid, 5 moles of maleic acid and 10 moles of hydrogenated bisphenol A.

An example of a commercial polyester which may be employed is American Cyanamid resin PD 11-7-989 which is a typical polyester prepared by the reaction of dihydric alcohols with dibasic acids. The unsaturated acid component used is maleic anhydride and the saturated acid isophthalic. The alkyd is dissolved in styrene at 65/35 alkyd styrene ratio and is inhibited with a common inhibitor.

The proportion of polyester resin employed is determined by the ultimate coating desired. Generally, 30 to 95 percent by weight of the coating composition is suitable, with from 40 to 60 by weight, being preferred.

While glass flake is a preferred strengthening agent, should one be desired, other strengtheners may be employed. Included are glass fibers, synthetic fibers, metallic fibers, etc. Depending upon end use application, desired properties, etc., the quantity of strengthener employed may range from 0 to 50 percent by weight of the coating composition.

Styrene is the preferred cross-linking agent, although any of those commonly employed and previously mentioned may also be used. While 10 to 50 percent by weight of the composition may be employed, the usual practice is to use a ratio of two parts of resin to one part of cross-linking agent.

The quantities of pentanedione and promotor will also vary, depending on the conditions of use, desired cure rates, etc. Generally, the amount of pentanedione found suitable is from 0.1 to 0.5 percent, by weight of the composition. The quantity of promotor employed may range from about 0.5 to 1.5 percent, by weight of the composition. As mentioned above, the ketone and promotor are mixed separately and the ratio of one to the other may vary from 1 to 3 parts of pentanedione to one part of promotor. To illustrate the correlation between pot life and curing rate, when no pentanedione was used, the pot life was two days but the time to cure to a satisfactory film was also two days and this is totally unsuitable. In the following examples, which are given for the purpose of illustrating the invention, all quantities given are to be understood to refer to percent by weight of the coating compositions described.

EXAMPLE I

A coating composition was prepared from the following components:

| | % by weight |
|---|---|
| Polyester Resin (Glidden 4193) | 45.0 |
| Pigment | 1.0 |
| Thixotropic agent (powdered silica) | 2.0 |
| Paraffin wax (air inhibitor) | 0.06 |
| Styrene | 25.86 |
| Glass Flake | 25.0 |
| Propylene Glycol | 0.68 |
| Cobalt Tallate | 0.2 |
| Pentanedione | 0.2 |

The pentanedione and cobalt tallate (derived from tall oil) were mixed first and the resulting product was added to the remaining components. This composition is a stable product and may be packaged and shipped for use at the point of application. In this case, 1 percent of tertiary butyl perbenzoate was added and the catalyzed composition was sprayed onto a ship's bottom. No gelation of this composition in the coating reservoir was observed until 2.5 hours of use and until this occurred, coating was permitted with ease during the entire period. During this coating period, the temperature of the composition and atmospheric temperature were the same, specifically 77° F.

EXAMPLE II

Example I was repeated, substituting manganese tallate for cobalt tallate, all of the other components and quantities being the same. Again at 77° F., gelation did not occur until 3 hours after spraying was started.

EXAMPLE III

Example I was repeated with 0.01 percent cobalt tallate. Pot life, or time to point of gelation, in this instance was 4 hours and again at application temperature of 77° F.

EXAMPLE IV

Example I was repeated with cobalt octoate as the metallic promotor. In this case, no gelation was observed until after 2½ hours of successful spraying.

The following three examples, employing cobalt naphthenate as the naphthenate as the metalic promotor, are given for the purpose of comparing the extended pot life system of the invention with the catalyst injection and split phase systems described above.

EXAMPLE V

Following the method of this invention, a coating composition was prepared using the following ingredients:

| | % by weight |
|---|---|
| American Cyanamid Polyester PDL-7-989* | 45.0 |
| Pigment | 1.0 |
| Thixotropic agent (powdered silica) | 2.0 |
| Air Paraffin wax | 0.06 |
| Styrene | 25.86 |
| Glass Flake | 25.0 |
| Propylene Glycol | 0.68 |
| Cobalt Naphthenate | 0.2 |
| 2,4-pentanedione | 0.2 |

* Polyester resin prepared from dihydric alcohols, maleic anhydride and isophthalic acid.

The foregoing composition was catalyzed with 1 percent of tertiary butyl perbenzoate just prior to use and the composition was sprayed onto a ship's bottom.

EXAMPLE VI

A composition of the type generally useful in a catalyst injection system was prepared as follows:

| | % by weight |
|---|---|
| American Cyanamid Polyester PDL-7-989 | 46.0 |

| | |
|---|---|
| Pigment | 1.0 |
| Cobalt Naphthenate | 0.2 |
| Dimethylaniline | 0.06 |
| Wax | 0.06 |
| Styrene | 25.0 |
| Propylene Glycol | 0.68 |
| Thixotropic agent (powdered silica) | 2.0 |

The foregoing components were blended and catalyzed with 1.0 percent tertiary butyl perbenzoate and the composition was sprayed onto a ship's bottom.

EXAMPLE VII

This example is illustrative of a formulation employed in a split phase system:

| Component I | % by weight |
|---|---|
| American Cyanamid Polyester PDL-7-989 | 46.0 |
| Pigment | 1.0 |
| Cobalt Naphthenate | 0.4 |
| Dimethylaniline | 0.12 |
| Wax | 0.06 |
| Styrene | 25.0 |
| Glass Flake | 25.0 |
| Propylene Glycol | 0.68 |
| Thixotropic agent (powdered silica) | 1.74 |
| Polyester (PDL-7-989) | 46.0 |
| Pigment | 1.0 |
| Wax | 0.06 |
| Styrene | 25.0 |
| Glass Flake | 25.0 |
| Propylene Glycol | 0.68 |
| Thixotropic agent (Silica) | 1.74 |

Prior to application of these materials to a ship's bottom 1 percent tertiary butyl perbenzoate was added to Component II. This catalyzed component and Component I were then employed as described previously for this system.

EXAMPLE VIII

In order to assess the effect of pentanedione in the split phase system, a formulation corresponding to that of Example VII was prepared using an 0.2 percent pentanedione and 24.8 percent of styrene, all other percentages being the same.

The formulations of Examples V to VIII as well as the curing and other characteristics of the films were evaluated and the results are tabulated in Table I. In all cases, the ships' bottoms were blasted to near white and coated before reoxidation of the surfaces occurred. The application temperature ranged from 70° – 75° F. at 75 percent relative humidity.

While the temperature of application in the foregoing Examples is given as 77° F. it will be obvious that a wide temperature range may be employed. Thus it has been found that the higher the temperature the shorter the pot life. In Table I, results are given of application at temperatures ranging from 50° to 100° F., ambient temperature. Also, the temperature of the surface to be coated should be warmer than 50° F. and depending on climatic conditions, the surface temperature may be as high as 150° F.

TABLE I

| | Catalyst injection | Split phase | Extended pot life |
|---|---|---|---|
| Pot Life 60°–100° F | 3–10 minutes [1] | 3–10 minutes | 1–6 hours.[1] |
| Pot Life 77° F | 8 minutes | 8 minutes | 2.5 hours. |
| Physical Cure | Excellent | Excellent | Excellent. |
| Wetting of Steel | Good | Good | Excellent. |
| Impact | Good | Good | Good. |
| Reverse Impact | Fair | Fair | Good. |
| Cut Back | Good | Good | Excellent. |
| Resistance to Flow | Good | Good | Good. |
| Abrasion Resistance | Good | Good | Good. |
| Cure 77° F | 6 hours minimum | 6 hours minimum | 16 hours minimum. |
| Hardness | 50 Barcal | 50 Barcal | 50 Barcal. |
| Film Thickness | 30–50 mils | 30–50 mils | 30–50 mils. |
| Water vapor transmission ASTM E 96–53T | .016 perms.[2] | .016 perms | .016 perms. |
| Adhesion | Good | Good | Excellent. |
| Viscosity | 110 KU | 110 KU | 110 KU. |

[1] .2 percent pentanedione.
[2] Rate of permeability.

Based on the comparisons given in Table I, it is obvious that the coating formulations prepared in the manner of this invention offer many advantages over the prior art. The increase in pot life, without sacrifice in any other property of the cured film, is dramatic. Additionally, it will be noted that there is marked improvement in wetting properties and that adhesion of the film to steel is also improved. The extension of the pot life of materials of this type is exceedingly important since it permits uninterrupted application for long periods, far in excess of coating periods available with the other systems.

The formulations and method of coating herein described are exceptionally suitable in marine applications and particularly on ship bottoms, rudders, stern frames, anchor chain areas, sea chests, bow thrusters, bulbous bows, boattops, decks, hatch covers and ballast and cargo tanks. The formulations are equally effective on static marine structures. The coatings are exceptionally resistant to corrosion, abrasion and impact. Generally, the adhesion to steel as well as to concrete, plywood and fiberglass is excellent.

While the invention has been described with certain unsaturated polyester resins and styrene as the cross-linking agents, it will be obvious that other air cured unsaturated polyesters in combination with other cross-linking agents are feasible. Similarly, instead of glass flake as the strengthening agent, other materials such as glass fibers or filaments, metallic fibers or filaments, synthetic materials, etc., may be employed.

What is claimed is:

1. The method of preparing a glass-filled polyester laminate by spraying a glass-filled cross-linked polyester resinous composition onto a metallic surface, said glass-filled cross-linked polyester resinous composition being characterized by its slow gelation in the reservoir from where it is sprayed, said slow gelling composition being prepared by (1) mixing 30 to 95 percent, by weight of the composition, of a polyester resin, 10 to 50 percent, by weight of the composition, of a cross-linking agent, and up to 50%, by weight of the composition, of glass; (2) adding to the mixture prepared in step (1) the product obtained by reacting 0.1 to 0.5 percent, by weight of the composition, of pentanedione with from 0.5 to 1.5 percent, by weight of the composition, of a metallic promotor; (3) adding about 1 percent, by weight of the composition, of a catalyst capable of generating free radicals to the mixture of step (2); and (4) spraying said mixture onto a metallic surface, said catalyst mixture being added immediately prior to the coating step.

2. The method of claim 1 in which the metallic promotor is selected from the group consisting of metallic naphthenates, tallates and octoates.

3. The method of claim 1 in which the metallic promotor is cobalt naphthenate.

4. The laminate prepared by the method of claim 1.

5. The method of claim 1 in which the cross-linking agent is styrene.

6. The method of claim 1 in which the cross-linking agent is styrene, the promotor is cobalt naphthenate, and the strengthener is glass flake.

7. The method of claim 1 in which the peroxide catalyst is tertiary butyl perbenzoate.

* * * * *